Dec. 17, 1963    H. F. PETERS    3,114,839
RADIATION SHIELDING PLASTIC CLAD
Filed May 25, 1959
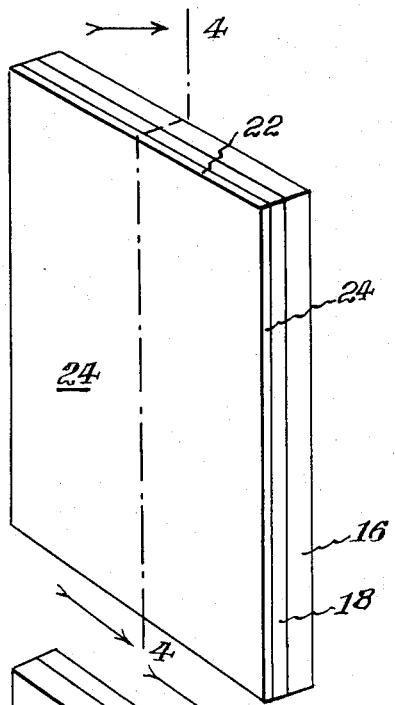
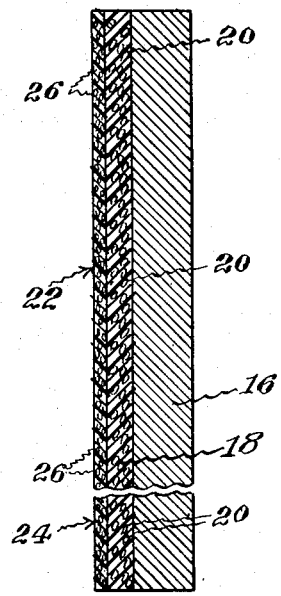
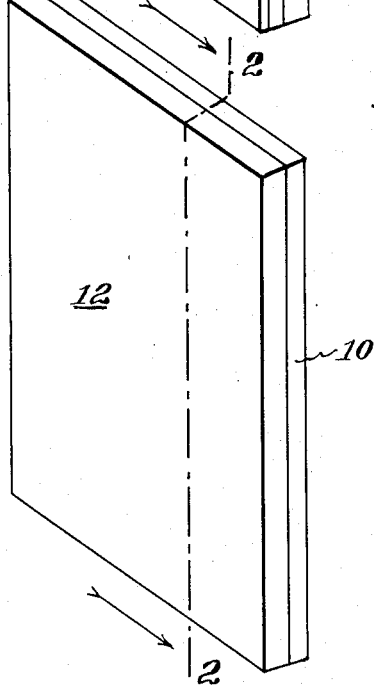
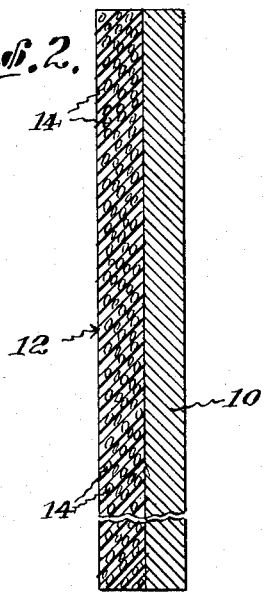
INVENTOR
HENRY F. PETERS.
BY Daniel E. Igo.
ATTORNEY

United States Patent Office 3,114,839
Patented Dec. 17, 1963

3,114,839
RADIATION SHIELDING PLASTIC CLAD
Henry F. Peters, Malvern, Pa., assignor to Lukens Steel Company, Coatesville, Pa., a corporation of Pennsylvania
Filed May 25, 1959, Ser. No. 815,386
3 Claims. (Cl. 250—108)

This invention relates to composite structures used for radiation shielding. With the advent of atomic energy, as well as the use of X-rays, and the application of atomic energy to peaceful as well as military uses, has come the problem of adequate radiation shielding to protect both biological and structural objects against deleterious rays. The subject of shielding against such rays has been given considerable study over the past 15 years, and in the case of X-rays, before this time, and many methods and substances have been investigated as protecting means for the purpose of shielding against such harmful rays. The path of this investigational effort has been along the line of utilizing heavy metal plates, such as lead plates, conglomerates, such as concrete, water, etc.

The ability of a material to absorb such radiation rays without detrimental effects to human beings as well as materials of various kinds is not the only phase of the problem; for once a satisfactory shielding material has been discovered, the problem then arises as to how to utilize the same in a structural form. This obviously can be considered a problem, particularly when certain metals, oxides, and organics are used as the shielding media.

An object of the invention, therefore, is the provision of a structure and method of making the same that relates to utilizing the absorption or slowing down properties of various radiation shielding materials in a form that will permit further fabrication of said materials into almost any desired structural shape.

Another object of the invention is to provide a method of producing a clad sheet or plate of any desirable shape, which is composed of a layer or layers of ferrous or non-ferrous metal or alloy, and a plastic radiation shielding material layer or layers, bonded to the metal layer or layers, which has been impregnated with an organic or inorganic material, or a combination of organic or inorganic materials, and the plastic clad article produced therefrom. The plastic layer of such construction has a high nuclear cross-section shielding action, and said plastic layer may be located on both sides of the base sheet or plate, i.e. the base sheet composed of ferrous or non-ferrous metal or alloys thereof. Alternatively several metal layers may be used interleaved with plastic shielding layers. The plastic layer serves as the matrix for the shielding material, and the ferrous or non-ferrous sheet or base plate provides the structural strength and to some extent at least assists in the shielding against said atomic or X-rays or other deleterious types of rays.

A further object of the invention is to provide a method of making an article from a radiation shielding plastic clad sheet or plate that may be fabricated into spherical or other shaped vessels, including tanks, walls for rooms, ceilings, floors, and may serve as the shielding means for laboratories, and building structures generally, or for vehicles where it is desired to protect against the harmful effects of radiation from neutrons, beta particles, gamma rays, or other harmful rays.

An additional object relates to the utilization of a backing plate or sheet of ferrous or non-ferrous metal which will offer an extremely varied amount of flexibility of materials and uses. For example, aluminum could be used as the backing plate if light weight is desired, or stainless steel could be used where a corrosion problem would be expected on the metal side of the sheet, as when used for tanks or pipes, the plastic side containing the shielding particles acting as the radiation shield for the same.

Yet another object is the provision of a plastic clad construction wherein the plastic layer or layers would be composed of materials of various hardnesses at room temperatures to adapt to different uses.

A further object relates to a plastic clad construction composed of three or more layers, one or more layers being plastic layers and one or more layers being metal layers, each of the layers having different characteristics.

A further object is to provide a method of construction wherein the degree of shielding from harmful rays may be varied by changing the amount of shielding material in the plastic layer as well as by varying the type of substance used as the impregnator, or by using several different types of shielding particles in the same plastic layer.

Other objects will appear hereinafter throughout the specification.

Referring now to the drawings:

FIGURE 1 is a perspective view showing one form of the invention;

FIGURE 2 is a vertical sectional view taken on the line 2—2 of FIGURE 1;

FIGURE 3 is a perspective view of another form of the invention; and

FIGURE 4 is a vertical sectional view taken on the line 4—4 of FIGURE 3.

As is well known, radiation from nuclear piles or reactors is made up mainly of neutrons, beta particles, and gamma rays. High energy electrons emanate from radioactive beta decay, or from machine accelerators or from electromagnetic radiation of the X-ray or gamma variety of rays. It has been found that certain materials are more efficient in their shielding effect in absorbing rays of different types. For example, boron and boric acid have been found to be efficient in the absorption of thermal neutrons. The use of tantalum, tungsten, thorium, lead and barium have been found advantageous when used for the absorption of fast neutrons as well as gamma rays. Oxides such as indium oxide, boron oxide, and cadmium oxide have been found to be efficacious in the absorption of the last named rays. However, in all cases, the ability of a material to absorb radiation has been found to follow the general exponential law, as follows:

$$(I/I_2) = e^{-\mu t}$$

where $I_0$ = initial intensity of the neutron beam
$I$ = intensity of beam after passing through the shielding material
$t$ = thickness of shielding material
$\mu = n\delta$
$n$ = number of atoms or nuclei per unit volume, or per cm.$^3$
$\delta$ = capture cross-section per atom in the unit cm.$^3$ The method of this invention includes the steps of producing a plastic sheet or sheets in a plastic clad construction, one or more of said sheets being impregnated with fines or flakes, the latter having the property of absorbing the deleterious rays. For example, a plastisol solution of polyvinyl chloride is poured into a receptacle or tank, and fines or flakes of the above metals or their oxides, or of inorganic or organic material, are added in a manner so that said fines or flakes are held in suspension in the plastisol solution, the concentration and combination of the additives composing the fines or flakes, depending upon the desired degree and type of shielding. The plate or sheet of backing material of ferrous or non-ferrous metal or alloys of either is then clad with the impregnated plastic by dipping the entire sheet or plate into the plastisol solution. In order to prevent the plate from being covered on both sides, in the event it is not desired to cover both sides of the plate with the plastic layer, one side of the plate may be masked or covered with a temporary protecting layer, or a metal is treated with a chemical activator on the bonding side only. It will, of course, be necessary to keep the plastisol solution in constant agitation during the dipping operation in order to evenly disperse the filler radiation absorbing material contained in suspension therein. Other cladding methods known in the art may be used also.

Several dipping operations can be performed so as to increase the thickness of the plastic layer. In this particular type of plastic, namely polyvinyl chloride plastisol, the thickness could vary from 20 mils to ½ inch or more, depending upon use. After the cladding step has been completed, the composite plate is then rolled, cut and subsequently welded or riveted into the desired structure, or the base plate is shaped and the plastic layer or layers added after shaping. For example, such plates or sheets are rolled in the usual manner to form cylindrical shells, the seams of which are welded by the standard welding procedures, with the exception that the plastic is stripped back the distance of approximately 2 to 3 inches from the desired weld joint prior to the welding operation.

After the welding operation is completed, the welded joint is then covered with a layer or layers of plastic with the radiation absorbing material incorporated therein.

As noted above, the backing sheet may be composed of a ferrous metal, non-ferrous metal, or alloy thereof. The plastic matrix used would depend to a large extent on the expected radioactivity of the environment to which the plastic clad would be subjected. The plastic sheet of polyvinyl chloride, for example, would be suitable for structures designed to give protection from radioactive fall-out from nuclear weapons, or for panels to shield X-ray equipment. Various other plastic materials known in the plastic art may be used, such as various artificial and natural resins, and the invention is not limited to one plastic nor to the thickness of the plastic sheet or layer, since the flexibility of the invention to meet varying radioactive conditions depends on the interrelationship of the three variables; namely, the type and gage of the backing sheet, the type of plastic matrix, and the combination and density of the shielding filler material. Both the thickness of the sheet of plastic and the density of the shielding material which is incorporated in the same may be varied in accordance with the use to be made of the radiation shielding plastic clad construction, as explained hereinafter.

It will be appreciated that where this construction is to be used to shield against harmful rays, the thickness of the plastic sheet will be greater and the density of the plastic shielding filler material will be greater when the objects to be shielded are located within or closely adjacent populated areas, or where it could be expected that the intensity of the rays due to radioactive fall-out from nuclear weapons would be greater. In addition, where sensitive instruments are used that would be affected by deleterious rays, the thickness of the shielding layer and the density of the filler material would be greater, consideration being further given to the location of such instruments. The same would also apply to human beings and animals who are to be protected against the harmful effects of such rays, where used in highly populated sections of the country. In such cases, the thickness and/or density of plastic shielding filler material would be greater than in thinly populated sections of the country. It would be impossible, therefore, to provide a definite thickness of the plastic matrix or density of shielding filler material for all types of constructions, as this would depend upon the conditions.

Referring to FIGURES 1 and 2 of the drawings, which are furnished for illustrative purposes only, the numeral 10 shows the backing plate or sheet. This backing plate may be composed of carbon or low-alloy steel, or it may comprise a stainless steel sheet, or a sheet of ferrous or non-ferrous metal or an alloy thereof, depending upon the type of use to be made of the structure, as indicated above.

The plastic layer is shown at 12, which layer may be a polyvinyl chloride. Various other plastic materials may be substituted for the polyvinyl chloride plastisol, such as a vinyl derivative, a cellulose ester, a methacrylate polymer, a cellulose ether, an acroloid, a vinyloid or an interpolymer or compound resin or a mixed cellulose derivative plasticized with triphenyl phosphate or dibutyl phthalate or other plasticizers. Other plastic layers may include various acrylate type resins that may be suitable for the purpose intended, i.e. they may be of such character as to readily hold in suspension the fines or flakes.

As shown in FIGURE 2, the fines or flakes are indicated by the numeral 14 and have been dispersed evenly throughout the plastic sheet, as shown. These flakes may be larger or smaller than indicated in the drawings, the size depending upon the types of flakes used and their use.

FIGURES 3 and 4 illustrate a second form of the invention wherein 16 shows the backing plate composed of a ferrous or non-ferrous metal or alloy thereof, and 18 indicates the plastic sheet having incorporated therein the fines or particles indicated by the numeral 20.

After the sheet 18 has been bonded to the backing layer 16 to form a structure similar to that shown in FIGURE 2, the structure is provided with a further dipping operation in a bath containing a different type of plastic which also may be a polyvinyl chloride, or another material as noted above, having different properties, such as hardness. The sheet, such as that shown in FIGURE 2, is, by way of example, dipped in another bath containing plastic having a different hardening characteristic, i.e. being harder upon cooling than the intermediate sheet 18. This outer sheet is indicated by the numeral 22 in FIGURE 4. The outer layer 22 may also contain abrasive material to provide a slightly abrasive characteristic on its outer surface 24, or a coloring agent for decorative purposes may be added to the bath. The clad therefore produced as shown in FIGURE 2 or FIGURE 4 may be later dipped in additional baths to form any desired number of plastic layers.

It will be understood that the fines 14, shown in FIGURE 2, and 20 shown in FIGURE 4, comprise the materials that are used in the absorbing of rays of different types, and these fines may, for example, be composed of boron, boric acid flakes, tantalum, tungsten, thorium, lead, barium, and oxides of indium, boron and cadmium as well as oxides of the above noted metals. Various other types of fines may be used, such as rice hulls, peanut shells and soybean hulls, and the various types of fines may be combined to form the absorbent material in a single bath. In other words, any combination of materials capable of absorbing rays of different types may comprise the fines that are distributed throughout the plastic layers 12 or 18 of FIGURES 2 and 4, respectively.

Referring again to FIGURE 4, the plastic layer 18 may contain one or a combination of said ray absorbing particles and the layer 22 may contain one or more of a different type of ray absorbing particles. These particles are indicated by the numeral 26 in the layer 22.

The radiation shielding plastic clad construction herein disclosed provides the following advantages, viz: (1) the utilization of all types of material having proper shielding properties in a form suitable for fabrication into the various structures such as walls for buildings, spherical vessels, tanks, industrial equipment, vehicles of various types, and any other uses where shielding against harmful rays are required; (2) a structure which combines radiation shielding with structural strength, due to the layers which compose the plastic clad construction; (3) the provision of a radiation shielding structure having corrosion resistance properties; (4) the provision for shielding against various types of harmful rays by the use of combinations of shielding materials in the plastic sheet to meet conditions involving several types of radiation while still providing structural strength of the shielding structure; (5) the provision of a plastic matrix of selective type to meet various conditions of radioactivity; (6) the variation of the thickness of plastic cladding and the variation of the concentration of the flakes or fines to meet various shielding conditions.

Although the preferred method includes the dipping of the metallic backing plate or sheet in a solution of plastic compound impregnated with fines or radiation absorbing material, it will be understood that the cladding layer may be bonded to the metallic backing plate by other known methods, such as by casting, or by first forming the impregnated plastic sheet and heat treating the said sheet to cause at least one of its surfaces to be partially melted, then uniting the sheet to a backing plate by pressure alone or by heat and pressure.

It will be understood that the metallic sheet shown in the several figures may be pre-formed to any desirable shape, or it may be formed to shape after the cladding operation has been completed.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:
1. A radiation shielding plastic clad construction comprising a metallic layer having sides, a first plastic layer having sides, one side of said plastic layer being bonded to a side of said metallic layer, said plastic layer having evenly dispersed throughout the cross-sectional area thereof a plurality of fines having radiation shielding characteristics, and a second plastic layer having sides, one side of which is bonded to the other side of said first named plastic layer, a plurality of fines of different character than said fines first named being incorporated in dispersed condition in said second named plastic layer the fines of one of said plastic layers being a material selected from the group consisting of rice hulls, peanut hulls and soybean hulls.

2. The structure of claim 1 wherein the said fines of the other plastic layer are composed of oxides of the class consisting of indium, boron and cadmium.

3. The structure of claim 1 wherein said plastic layers are composed of materials one have relatively soft and the other relatively hard characteristics.

References Cited in the file of this patent
UNITED STATES PATENTS

| | | |
|---|---|---|
| 2,628,173 | Fair | Feb. 10, 1953 |
| 2,701,217 | Fair | Feb. 1, 1955 |
| 2,796,529 | Morrison | June 18, 1957 |
| 2,807,727 | Fermi et al. | Sept. 24, 1957 |
| 2,858,451 | Silversher | Oct. 28, 1958 |
| 2,928,948 | Silversher | Mar. 15, 1960 |